(12) United States Patent
Lin

(10) Patent No.: US 12,244,201 B2
(45) Date of Patent: Mar. 4, 2025

(54) INDUSTRIAL HEAVY LOAD ELECTRIC LINEAR ACTUATOR

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/609,220

(22) Filed: Mar. 19, 2024

(65) Prior Publication Data

US 2024/0223058 A1 Jul. 4, 2024

Related U.S. Application Data

(63) Continuation of application No. 17/577,864, filed on Jan. 18, 2022, now Pat. No. 11,967,876.

(30) Foreign Application Priority Data

Dec. 7, 2021 (TW) .................................. 110214592

(51) Int. Cl.
| | |
|---|---|
| H02K 7/11 | (2006.01) |
| H02K 7/00 | (2006.01) |
| H02K 7/116 | (2006.01) |
| H02K 41/00 | (2006.01) |
| H02K 41/02 | (2006.01) |

(52) U.S. Cl.
CPC ............. *H02K 41/02* (2013.01); *H02K 7/003* (2013.01); *H02K 7/116* (2013.01)

(58) Field of Classification Search
CPC ........ H02K 41/02; H02K 7/003; H02K 7/116; F16H 2025/2081; F16H 25/20; F16H 37/12
See application file for complete search history.

(56) References Cited

U.S. PATENT DOCUMENTS 11,967,876 B2 * 4/2024 Lin ......................... F16H 37/12

* cited by examiner

*Primary Examiner* — Thomas Truong
(74) *Attorney, Agent, or Firm* — Chun-Ming Shih; HDLS IPR SERVICES

(57) ABSTRACT

An industrial heavy load electric linear actuator includes a gearbox, an electric motor, a lead screw, an extension pipe and a load baring structure. The electric motor is connected to the gearbox. A portion of the lead screw is received inside the gearbox and driven by the electric motor, and another portion of the lead screw is extended out of the gearbox. The extension pipe is movably fastened to the lead screw. The load bearing structure includes a sleeve, a bearing, a fastening element, a fixation seat, and a rear supporting seat. The sleeve is mounted to the lead screw and holds the bearing jointly with the fastening element. The fixation seat and the rear supporting seat hold the bearing at outer perimeters of the sleeve and the fastening element.

10 Claims, 6 Drawing Sheets

INDUSTRIAL HEAVY LOAD ELECTRIC LINEAR ACTUATOR

CROSS-REFERENCE TO RELATED APPLICATION

This application is a continuing application of U.S. patent application Ser. No. 17/577,864, filed on Jan. 18, 2022, and entitled "INDUSTRIAL HEAVY LOAD ELECTRIC LINEAR ACTUATOR". The entire disclosures of the above application are all incorporated herein by reference.

BACKGROUND OF THE DISCLOSURE

Technical Field

The technical field of the present disclosure relates to an electric linear actuator, and in particular, to an industrial heavy load electric linear actuator.

Description of Related Art

Electric linear actuators have been widely applied to various types of machineries and equipment in the industry, in order to assist operators to transport or move heavy objects. Since the weights of such heavy objects may range from several hundred kilograms to several thousand kilograms, there is a need for improvement of the electric linear actuators used in such machineries and equipment.

For a related-art electric linear actuator, it mainly utilizes the electric motor in conjunction with a reduction mechanism to drive the lead screw to rotate. In addition, through the driving of the lead screw, the extension pipe fastened thereto is able to perform linear extension or retraction actions.

However, despite that the related-art electric linear actuator is equipped with the actuation effect, its actual use in practice still needs to be improved. When the extension pipe is under a load, the lead screw receiving the force further transmits it to the gearbox cover. Since most of the gear box covers are made of plastic material or material suitable for die casting, the strength of components made from such material has been found to be relatively weak and insufficient. Consequently, the maximum acceptable load for the electric linear actuator is greatly restricted and limited. There have been manufacturers aim to increase the thickness of the gearbox cover to increase its strength, however, the level of the load weight increased via such method is still limited, and the ineffective distance associated with such method is also increased.

In view of the above, the inventor seeks to overcome the aforementioned drawbacks and aims to provide an effective solution through extensive researches along with utilization of academic principles and knowledge.

SUMMARY OF THE DISCLOSURE

Tn objective of the present disclosure is to provide an industrial heavy load electric linear actuator, capable of utilizing a load bearing structure to allow the electric linear actuator to bear a maximum load.

To achieve the aforementioned objective, the present disclosure provides an industrial heavy load electric linear actuator, including a gearbox, an electric motor, a lead screw, an extension pipe, a load bearing structure and at least one braking mechanism. The electric motor is connected to the gearbox. A portion of the lead screw is received inside the gearbox and is driven by the electric motor, and another portion of the lead screw is extended to an external of the gearbox. The extension pipe is fastened to and driven by the lead screw. The load bearing structure includes a sleeve, a bearing, a fastening element, a fixation seat, and a rear supporting seat. The sleeve is mounted to the lead screw and holds the bearing jointly with the fastening element. The fixation seat and the rear supporting seat hold the bearing and form on outer perimeters of the sleeve and the fastening element. The electric motor comprising a driving gear, and the braking mechanism arranged inside the gearbox and disposed on one lateral side of the driving gear.

The present disclosure is able to achieve the following technical effects. With the load bearing structure configured to bear the entire weight of the load, the cover of the gearbox may be manufactured to have a thin thickness, such that the material cost is reduced and the ineffective distance may also be reduced. With the arrangement of the braking mechanism, when the present disclosure is applied to a heavy load field, the situation of failure of locking may be prevented. As the braking mechanism is arranged at one lateral side of the electric motor, the entire length may be controlled to be within an appropriate range.

DETAILED DESCRIPTION

Figure 1:
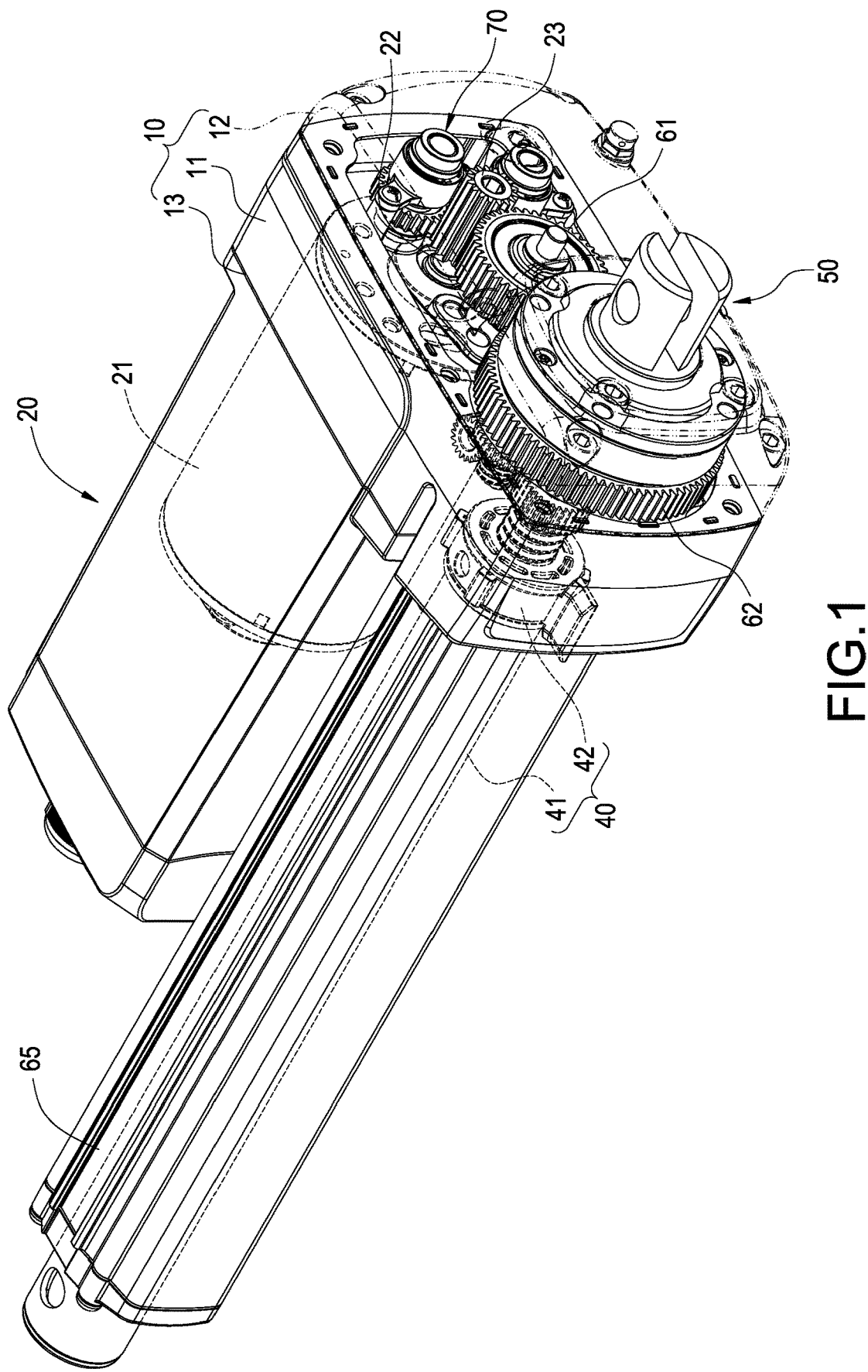
FIG. 1 is a perspective view showing an assembly of the industrial heavy load electric linear actuator of the present disclosure.
Figure 2:
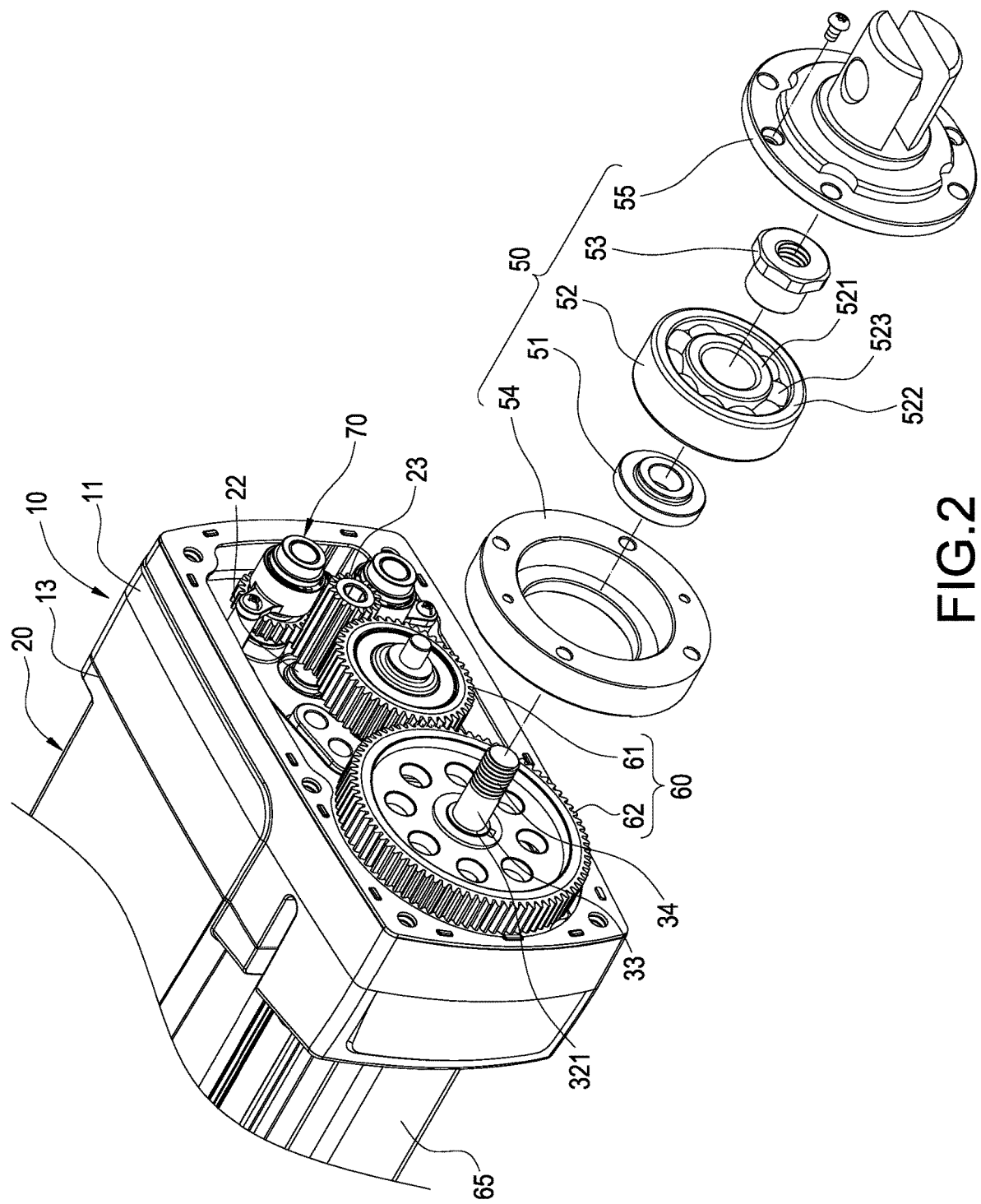
FIG. 2 is an exploded view of the load bearing structure separated from the lead screw of the present disclosure.
Figure 3:
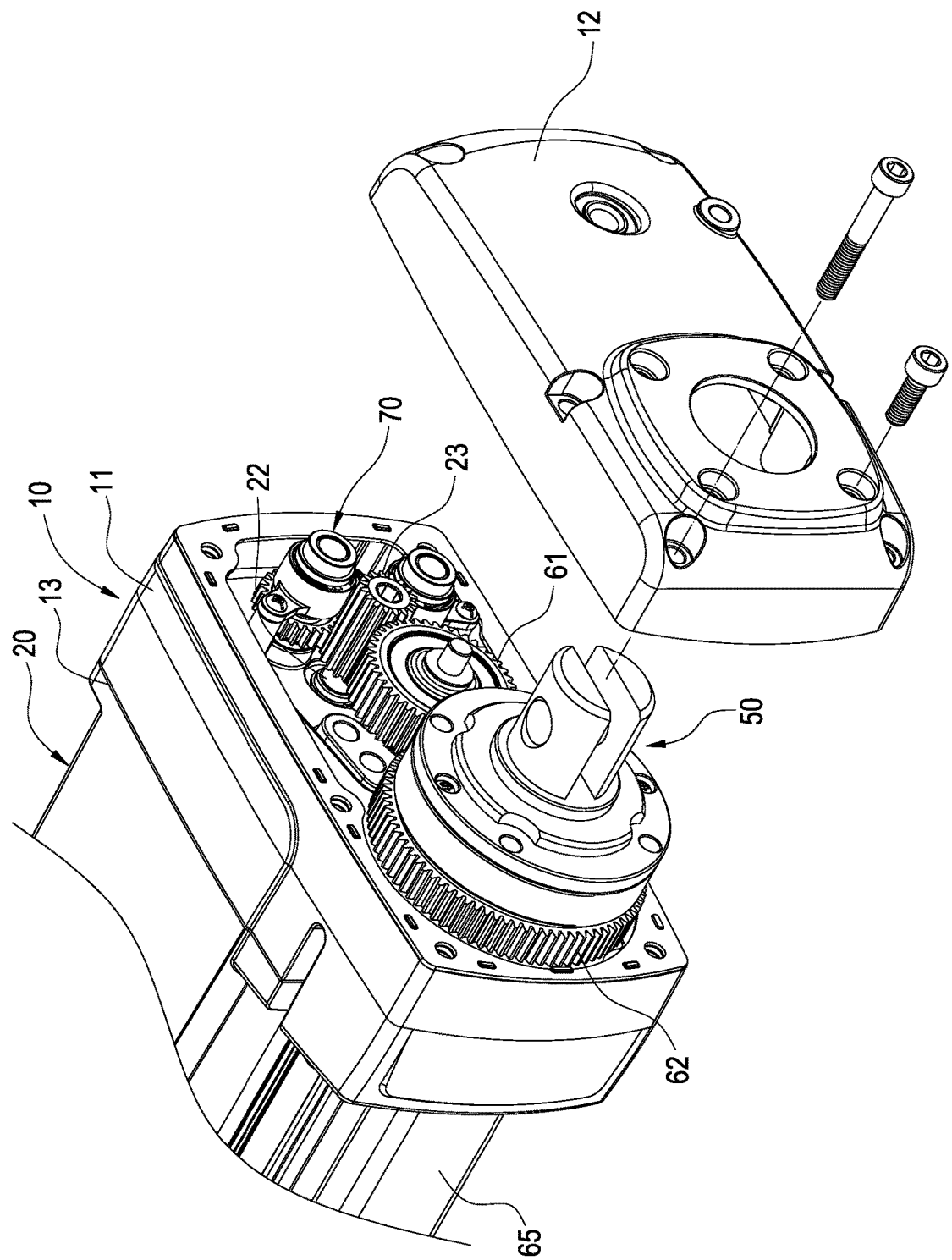
FIG. 3 is an exploded view showing the load bearing structure attached to the lead screw of the present disclosure.
Figure 4:
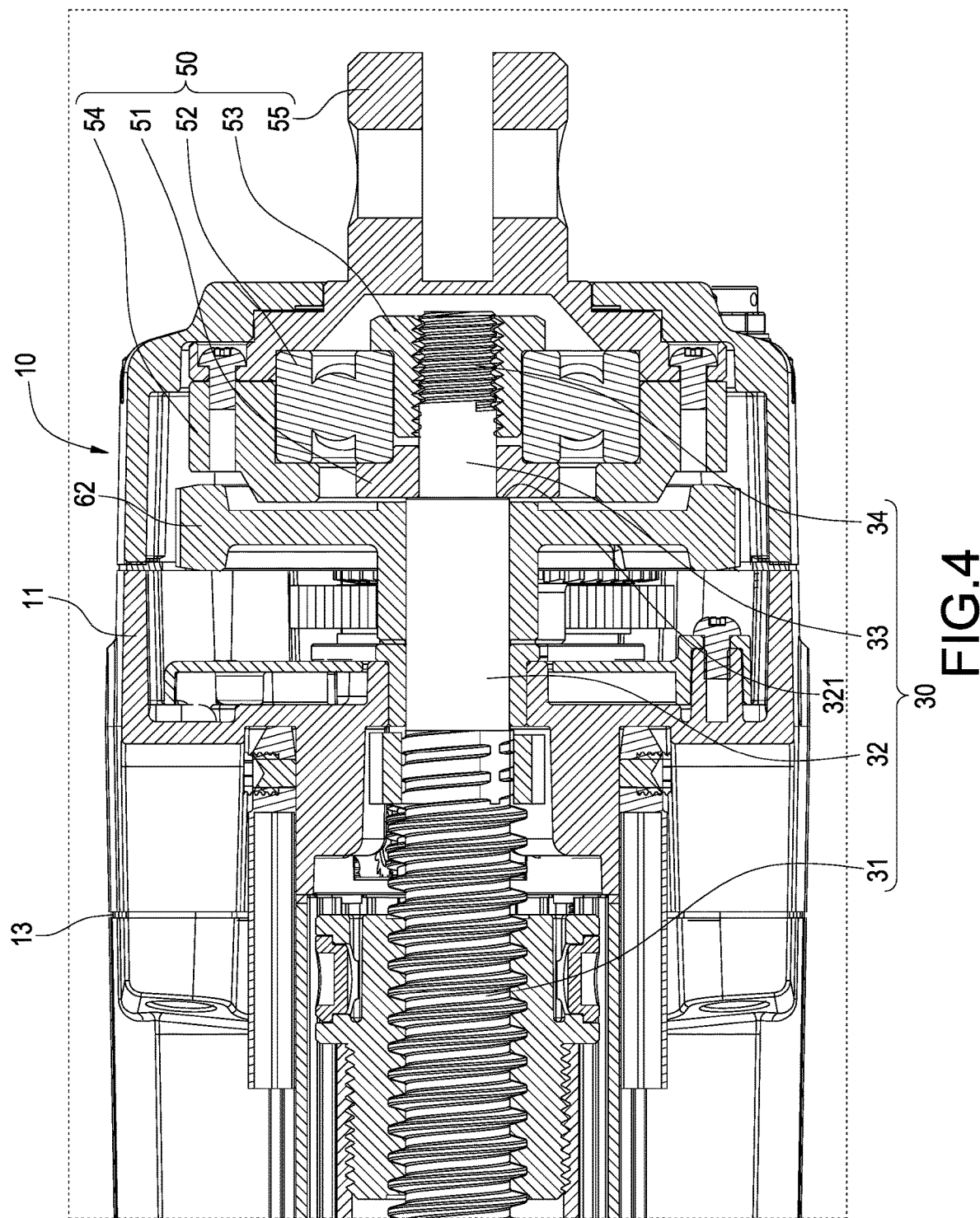
FIG. 4 is a cross sectional view showing an assembly of the industrial heavy load electric linear actuator of the present disclosure.

The technical contents of the present disclosure will become apparent with the detailed description of embodiments accompanied with the illustration of related drawings as follows. It is intended that the embodiments and drawings disclosed herein are to be considered illustrative rather than restrictive.

As shown in FIG. 1 to FIG. 4, the present disclosure provides an industrial heavy load electric linear actuator, mainly including a gearbox 10, an electric motor 20, a lead screw 30, an extension pipe 40 and a load bearing structure 50.

The gearbox 10 mainly includes a base 11 and a cover 12 covered onto the base 11 correspondingly, thereby forming a hollow rectangular box via the use of fastening elements, such as screws, etc. A receiving portion 13 is formed at one side of the base 11 opposite to the cover 12.

The electric motor 20 is installed corresponding to the receiving portion 13, and the electric motor 20 mainly includes an electric motor main body 21, a rotating axle 22 extended from a center of the electric motor main body 21 and a driving gear 23 connected to the rotating axle 22 and driven to rotate. The electric motor main body 21 is formed at an external of the gearbox 10, and the rotating axle 22 and the driving gear 23 are disposed inside the gearbox 10.

The lead screw 30 is also installed corresponding to the receiving portion 13 and is formed at one lateral side of the electric motor 20. A portion of the lead screw 30 is received inside the gearbox 10 and is driven by the electric motor 20, and another portion of the lead screw 30 is extended to an external of the gearbox 10 toward a direction away from the base 11. In this exemplary embodiment, the lead screw 30 is generally arranged parallel to the electric motor main body 21. The lead screw 30 mainly includes a first threaded section 31, a first shaft section 32 extended from the first threaded section 31, a second shaft section 33 extended from the first shaft section 32 and a second threaded section 34 extended from the second shaft section 33. A diameter of the second shaft section 33 is smaller than a diameter of the first shaft section 32, thereby forming a stopping surface 321 between the first shaft section 32 and the second shaft section 33.

The extension pipe 40 mainly includes an inner pipe member 41 and a nut 42 secured at an end portion of the inner pipe member 41. The inner pipe member 41 is mounted to an outer circumference of the lead screw 30, and the nut 42 is fastened to and driven by the first threaded section 31.

The load bearing structure 50 mainly includes a sleeve 51, a bearing 52, a fastening element 53, a fixation seat 54 and a rear supporting seat 55. The bearing 52 mainly includes an inner ring 521, an outer ring 522 formed at an outer perimeter of the inner ring 521 and a plurality of balls 523 received between the inner ring 521 and the outer ring 522. The sleeve 51 is mounted to the second shaft section 33 of the lead screw 30 and abuts against the stopping surface 321 of the first shaft section 32. The fastening element 53 is fastened to the second threaded section 34 in order to press the inner ring 521 jointly with the sleeve 51. The fixation seat 54 and the rear supporting seat 55 jointly hold and enclose the outer ring 522 and are formed at the outer perimeters of the sleeve 51 and the fastening element 53. The fixation seat 54 and the rear supporting seat 55 are components made of a metal material.

In an exemplary embodiment, the industrial heavy load electric linear actuator of the present disclosure further includes a reduction gear set 60 arranged inside the gearbox 10. The reduction gear set 60 mainly includes a first driven gear 61 and a second driven gear 62. The first driven gear 61 is engaged with and driven by the driving gear 23. The second driven gear 62 is mounted and attached to the first shaft section 32 via a wedge key. The second driven gear 62 is engaged with and driven by the first driven gear 61, thereby achieving the reduction transmission between the electric motor 20 and the lead screw 30.

In an exemplary embodiment, the industrial heavy load electric linear actuator of the present disclosure includes an outer pipe member 65. The outer pipe member 65 is installed along the outer perimeter of the lead screw 30, and one end of the outer pipe member 65 is connected to the receiving portion 13 of the gearbox 10. The extension pipe 40 penetrates into the internal of the outer pipe member 65, and a plurality of guiding slots (not labeled in the drawings) are formed at the inner wall of the outer pipe member 65 for the outer circumference of the nut 42 to be engaged therewith, such that the extension pipe 40 is permitted to perform linear movement in the axial direction relative to the outer pipe member 65 only.

During the use of the present disclosure, when the extension pipe 40 is applied to provide a push force, the acting force of the load is sequentially transmitted through the lead screw 30, the sleeve 51 and the inner ring 521, and is further transmitted through the outer ring 522 to the rear supporting set 55. When the extension pipe 40 is applied to provide a pulling force, the acting force of the load is sequentially transmitted through the lead screw 30, the fastening element 53 and the inner ring 521, and is further transmitted through the outer ring 522 to the fixation seat 54.

Figure 5:
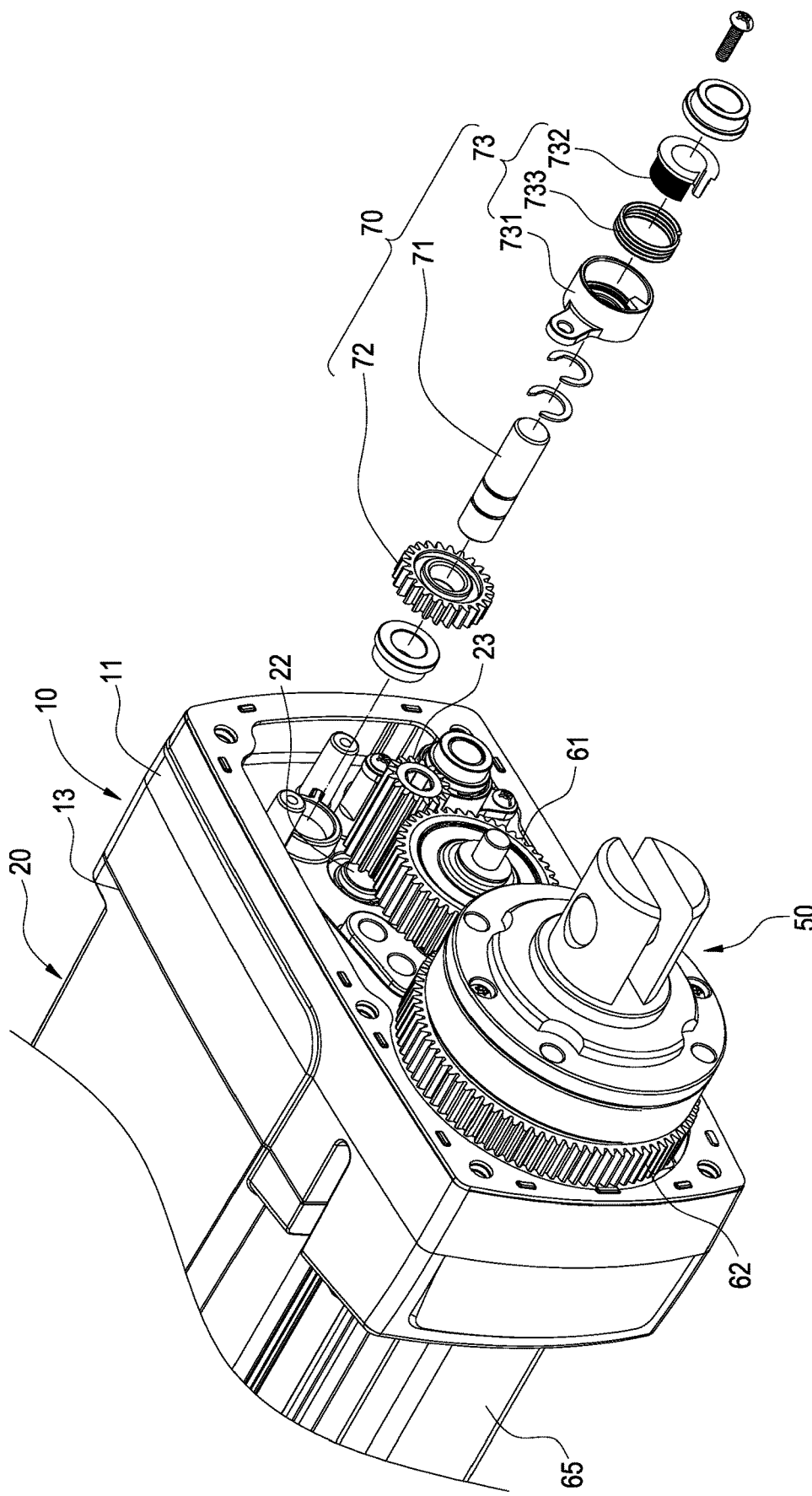
FIG. 5 is an exploded view of the braking mechanism separated from the gearbox of the present disclosure.
Figure 6:
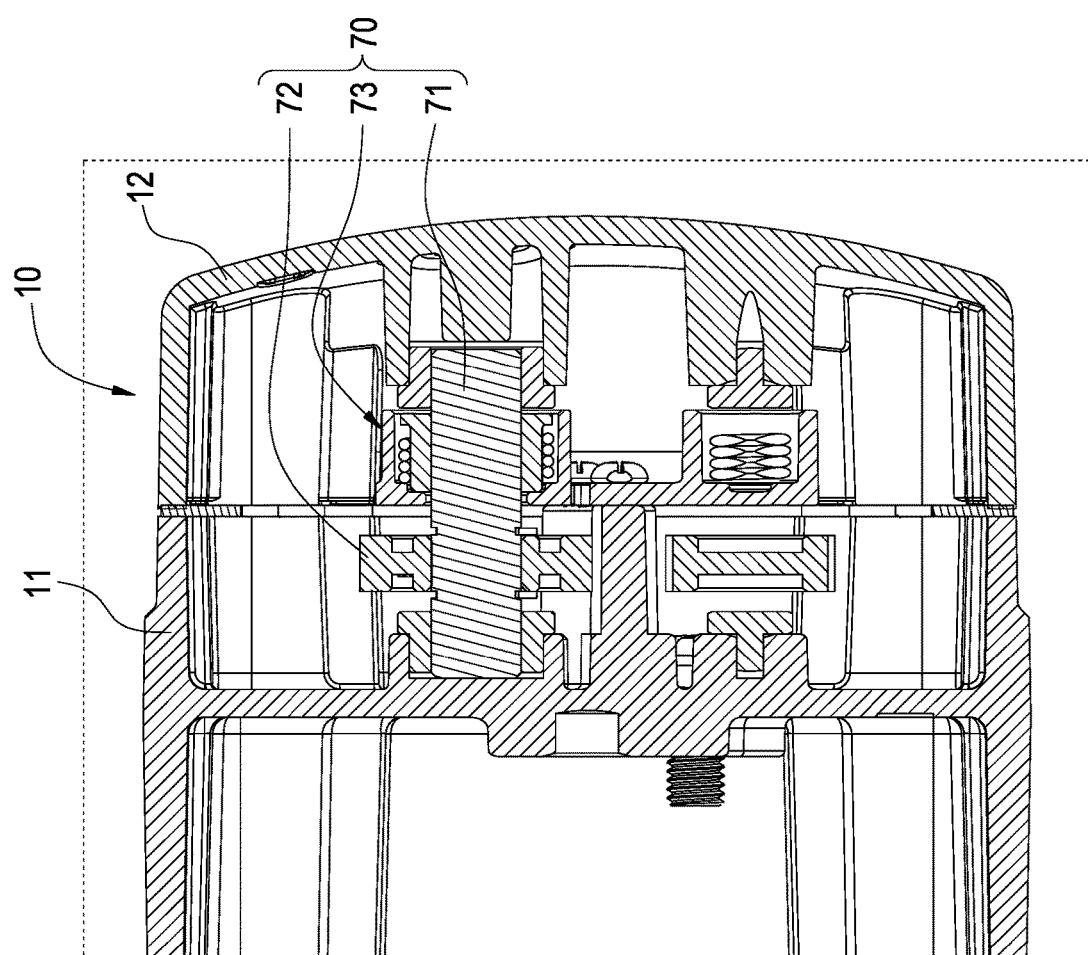
FIG. 6 is a cross sectional view showing the braking mechanism attached to the gearbox of the present disclosure.

Please refer to FIG. 5 and FIG. 6. In an exemplary embodiment, the industrial heavy load electric linear actuator of the present disclosure further includes at least one braking mechanism 70 arranged inside the gearbox 10 and disposed at one lateral side of the driving gear 23 of the electric motor 20. The quantity of the baking mechanism 70 may be adjusted according to the actual magnitude of the load acting force. In this exemplary embodiment of the present disclosure, the quantity of the braking mechanism is two, and each one of the braking mechanisms 70 mainly includes a shaft 71, a driven gear 72 and a braking assembly 73. The shaft 71 penetrates through the driven gear 72 and is arranged inside the gearbox 10. The driven gear 72 is engaged with and drive by the driving gear 23. The braking assembly 73 is mounted on the shaft 71.

In an exemplary embodiment of the present disclosure, the braking assembly 73 mainly includes an accommodating seat 731, a braking ring 732 and a coil spring 733. The coil spring 733 is fastened to an outer circumference of the braking ring 732 and is jointly received inside the accommodating seat 731 with the braking ring 732. One end of the accommodating seat 731 is secured to the base 11, and the braking ring 732 is mounted to an outer circumference of the shaft 71. In addition, one end of the coil spring 733 is positioned at the accommodating seat 731. During operation, the coil spring 733 is used to fasten the baking ring 732 in order to generate frictional damping between the inner wall of the braking ring 732 and the outer circumferential surface of the shaft 71, thereby achieving the effect of speed reduction and braking with such braking assembly 73.

In view of the above, the industrial heavy load electric linear actuator of the present disclosure is able to achieve the expected purpose of use and to overcome known drawbacks.

What is claimed is:

1. An industrial heavy load electric linear actuator, comprising:
   a gearbox;
   an electric motor, connected to the gearbox;
   a lead screw, a portion thereof received inside the gearbox and driven by the electric motor, and another portion thereof extended to outside of the gearbox;
   an extension pipe, movably fastened with the lead screw;
   a load bearing structure, comprising a sleeve, a bearing, a fastening element, a fixation seat and a rear supporting seat, the sleeve mounted on the lead screw and holding the bearing jointly with the fastening element, and the fixation seat and the rear supporting seat holding the bearing and disposed on outer perimeters of the sleeve and the fastening element; and
   at least one braking mechanism, the electric motor comprising a driving gear, and the braking mechanism arranged inside the gearbox and disposed on one lateral side of the driving gear;
   wherein the fixation seat and the rear supporting seat are metal components to cover the sleeve, the bearing and the fastening element.

2. The industrial heavy load electric linear actuator according to claim 1, wherein the bearing comprises an inner ring and an outer ring disposed on outer perimeter of the inner ring, the sleeve and the fastening element jointly hold the inner ring, and the fixation seat and the rear supporting seat jointly hold the outer ring.

3. The industrial heavy load electric linear actuator according to claim 2, wherein when the extension pipe is applied to provide a push force, an acting force of a load is sequentially transmitted through the lead screw, the sleeve and the inner ring, and further transmitted through the outer ring to the rear supporting seat.

4. The industrial heavy load electric linear actuator according to claim 2, wherein when the extension pipe is applied to provide a pulling force, an acting force of a load is sequentially transmitted through the lead screw, the fastening element and the inner ring, and further transmitted through the outer ring to the fixation seat.

5. The industrial heavy load electric linear actuator according to claim 2, wherein the lead screw comprises a first threaded section, a first shaft section extended from the first threaded section, a second shaft section extended from the first shaft section and a second threaded section extended from the second shaft section, a diameter of the second shaft section is smaller than a diameter of the first shaft section, and a stopping surface is disposed between the first shaft section and the second shaft section.

6. The industrial heavy load electric linear actuator according to claim 5, wherein the first threaded section is movably fastened to the extension pipe, the sleeve is mounted on the second shaft section and abuts against the stopping surface, and the fastening element is fastened to the second threaded section and presses the inner ring jointly with the sleeve.

7. The industrial heavy load electric linear actuator according to claim 1, wherein the braking mechanism is multiple in number, and each the braking mechanism arranged inside the gearbox and disposed on one lateral side of the driving gear.

8. An industrial heavy load electric linear actuator, comprising:
a gearbox;
an electric motor, connected to the gearbox;
a lead screw, a portion thereof received inside the gearbox and driven by the electric motor, and another portion thereof extended to outside of the gearbox;
an extension pipe, movably fastened with the lead screw;
a load bearing structure, comprising a sleeve, a bearing, a fastening element, a fixation seat and a rear supporting seat, the sleeve mounted on the lead screw and holding the bearing jointly with the fastening element, and the fixation seat and the rear supporting seat holding the bearing and disposed on outer perimeters of the sleeve and the fastening element; and
at least one braking mechanism, the electric motor comprising a driving gear, and the braking mechanism arranged inside the gearbox and disposed on one lateral side of the driving gear;
wherein the bearing comprises an inner ring and an outer ring disposed on outer perimeter of the inner ring, the sleeve and the fastening element jointly hold the inner ring, and the fixation seat and the rear supporting seat jointly hold the outer ring;
wherein the braking mechanism comprises a shaft, a driven gear and a braking assembly, the shaft penetrates through the driven gear and is arranged inside the gearbox, the driven gear is engaged with and driven by the driving gear, and the braking assembly is mounted on the shaft.

9. The industrial heavy load electric linear actuator according to claim 8, wherein the braking assembly comprises an accommodating seat, a braking ring and a coil spring, the coil spring is fastened to outer circumference of the braking ring and is jointly received inside the accommodating seat with the braking ring, one end of the accommodating seat is secured to the gearbox, the braking ring is mounted on outer circumference of the shaft, and one end of the coil spring is positioned on the accommodating seat.

10. An industrial heavy load electric linear actuator, comprising:
a gearbox;
an electric motor, connected to the gearbox;
a lead screw, a portion thereof received inside the gearbox and driven by the electric motor, and another portion thereof extended to outside of the gearbox;
an extension pipe, movably fastened with the lead screw;
a load bearing structure, comprising a sleeve, a bearing, a fastening element, a fixation seat and a rear supporting seat, the sleeve mounted on the lead screw and holding the bearing jointly with the fastening element, and the fixation seat and the rear supporting seat holding the bearing and disposed on outer perimeters of the sleeve and the fastening element;
at least one braking mechanism, the electric motor comprising a driving gear, and the braking mechanism arranged inside the gearbox and disposed on one lateral side of the driving gear; and
a reduction gear set arranged inside the gearbox, the reduction gear set comprising a first driven gear and a second driven gear, the first driven gear engaged with and driven by the driving gear, and the second driven gear mounted on the lead screw and engaged with and driven by the first driven gear.

* * * * *